United States Patent [19]
Watanabe et al.

[11] Patent Number: 5,147,659
[45] Date of Patent: Sep. 15, 1992

[54] NOZZLE TOUCH APPARATUS IN AN INJECTION MOLDING MACHINE

[75] Inventors: Kikuo Watanabe, Oshino; Masaki Muranaka, Shibuya; Masayuki Iwatsuki, Kofu, all of Japan

[73] Assignee: Fanuc Ltd, Minamitsuru, Japan

[21] Appl. No.: 465,270

[22] PCT Filed: Jul. 27, 1989

[86] PCT No.: PCT/JP89/00771
§ 371 Date: May 24, 1990
§ 102(e) Date: May 24, 1990

[87] PCT Pub. No.: WO90/01404
PCT Pub. Date: Feb. 22, 1990

[30] Foreign Application Priority Data
Aug. 5, 1988 [JP] Japan .................. 63-194585

[51] Int. Cl.⁵ ............................ B29C 45/80
[52] U.S. Cl. ................... 425/145; 425/149; 425/171; 425/574
[58] Field of Search ........... 425/145, 149, 170, 171, 425/150, 567, 569, 574, 135

[56] References Cited
U.S. PATENT DOCUMENTS 4,540,359  9/1985  Yamazaki ............ 425/589
4,676,730  6/1987  Yamasaki ............ 425/574

FOREIGN PATENT DOCUMENTS 61-135610  8/1986  Japan .
2085915    4/1987  Japan ............... 425/574

Primary Examiner—Tim Heitbrink
Attorney, Agent, or Firm—Staas & Halsey

[57] ABSTRACT

A nozzle touch apparatus (5) for use in an injection molding machine, which is capable of automatically adjusting a nozzle touch force in a multi-stage fashion during execution of an injection molding cycle, having springs (56) each fitted on a guide rod (52) and disposed between a ball nut (54) and an extension portion (43) of an extruder base of an injection unit (4), the guide rod being formed integrally with the ball nut which is threadedly engaged with a ball screw (52) coupled to a servomotor (51) and inserted through a hole (43a) formed in the extension portion. The nozzle touch apparatus further includes a servo circuit (63) supplied with a signal from a strain gauge (61) provided on the extension portion and indicative of an actual nozzle touch force, and a signal supplied from a numerical control unit (64) and indicative of a predetermined nozzle touch force. The servo circuit is operable to drive the servomotor in accordance with a deviation between these signals to cause the guide rods to move, whereby the springs are brought into a compressed state in which the actual nozzle touch force consistent with the predetermined nozzle touch force is generated, the predetermined nozzle touch force being changed to a smaller value upon shift from a mold closing process to a mold opening process, thereby preventing deformation of a mold in the mold opening.

13 Claims, 2 Drawing Sheets

NOZZLE TOUCH APPARATUS IN AN INJECTION MOLDING MACHINE

BACKGROUND OF THE INVENTION

1. Field of the Invention

The present invention relates to a nozzle touch apparatus in an injection molding machine, which is capable of automatically variably adjusting a nozzle touch force with advancement of an injection molding cycle.

2. Description of the Related Art

An injection molding machine is arranged to inject molten resin from an injection unit into a cavity defined by two mold halves respectively mounted on stationary and movable platens of a mold clamping unit, to thereby produce a molded product. To prevent leakage of the thus injected resin between a nozzle of the injection unit and a sprue bushing of the stationary mold half of the mold clamping unit, the nozzle is arranged to be in urged contact with the sprue bushing with a predetermined nozzle touch force. Further, maintenance of the injection unit is carried out, with the injection unit separated from the mold clamping unit. To this end, generally, the injection molding machine comprises a nozzle touch apparatus which operates to move the whole of the injection unit in the directions toward and away from the mold clamping unit.

A typical nozzle touch apparatus comprises an urging member which is driven by a hydraulic cylinder or an induction motor so as to be moved in the directions toward and away from the mold clamping unit. The urging member operates to urge the injection unit through a spring mounted on the urging member so as to move the injection unit toward the mold clamping unit. Arrival of the urging member to its moving position (wherein the spring is compressed by a predetermined amount to produce a predetermined nozzle touch force) is detected by a limit switch, a proximity switch or the like. That is, an adjustment of the nozzle touch force is effected by adjusting a position at which the detection switch is to be located. Accordingly, a difficulty is encountered in adjusting the nozzle touch force, in particular, during execution of an injection molding cycle. As a result, the resultant nozzle touch force may be excessive in magnitude. In this case, when a mold-opening state wherein no urging force is applied from a movable mold half to a stationary mold half in the direction opposite to that of the nozzle touch force is achieved, the stationary mold half 101, in particular, a hollowed and thin type of mold half such as a hot runner type of mold, and clampers 102 employed for mounting the stationary mold half onto the stationary platen are liable to be deformed, as shown in FIG. 3.

SUMMARY OF THE INVENTION

An object of the present invention is to provide a nozzle touch apparatus in an injection molding machine, which is capable of automatically variably adjusting a nozzle touch force with advancement of an injection molding cycle.

In order to achieve the above-mentioned object and others, according to the present invention, this is provided a nozzle touch apparatus, which is mounted on an injection molding machine having a mold clamping unit and an injection unit which is arranged to be movable toward and away from the mold clamping unit, which includes a transfer section having a servomotor serving as a driving source, and means for generating a nozzle touch force, for moving the injection unit toward and away from the mold clamping unit and for generating the nozzle touch force a detecting section for detecting an actual nozzle touch force, a setting section for variably setting a predetermined nozzle touch force; and a control section for controlling drive of the servomotor in accordance with a deviation between the actual nozzle touch force and the predetermined nozzle touch force.

As explained above, according to the present invention, since the drive of the servomotor is controlled in accordance with the deviation between the actual nozzle touch force and the predetermined nozzle touch force which is set variably so as to move the injection unit toward and away from the mold clamping unit to thereby produce the nozzle touch force, this nozzle touch force is automatically variably controllable, in a multi-stage fashion, for instance, with the advancement of the injection molding cycle, so that the nozzle touch force during a mold opening process is optimized, to thereby prevent deformation of a stationary mold half and of clampers employed for mounting the stationary mold half onto a stationary platen, which deformation would be otherwise likely to occur during the mold opening.

DETAILED DESCRIPTION OF THE PREFERRED EMBODIMENTS

Figure 1:
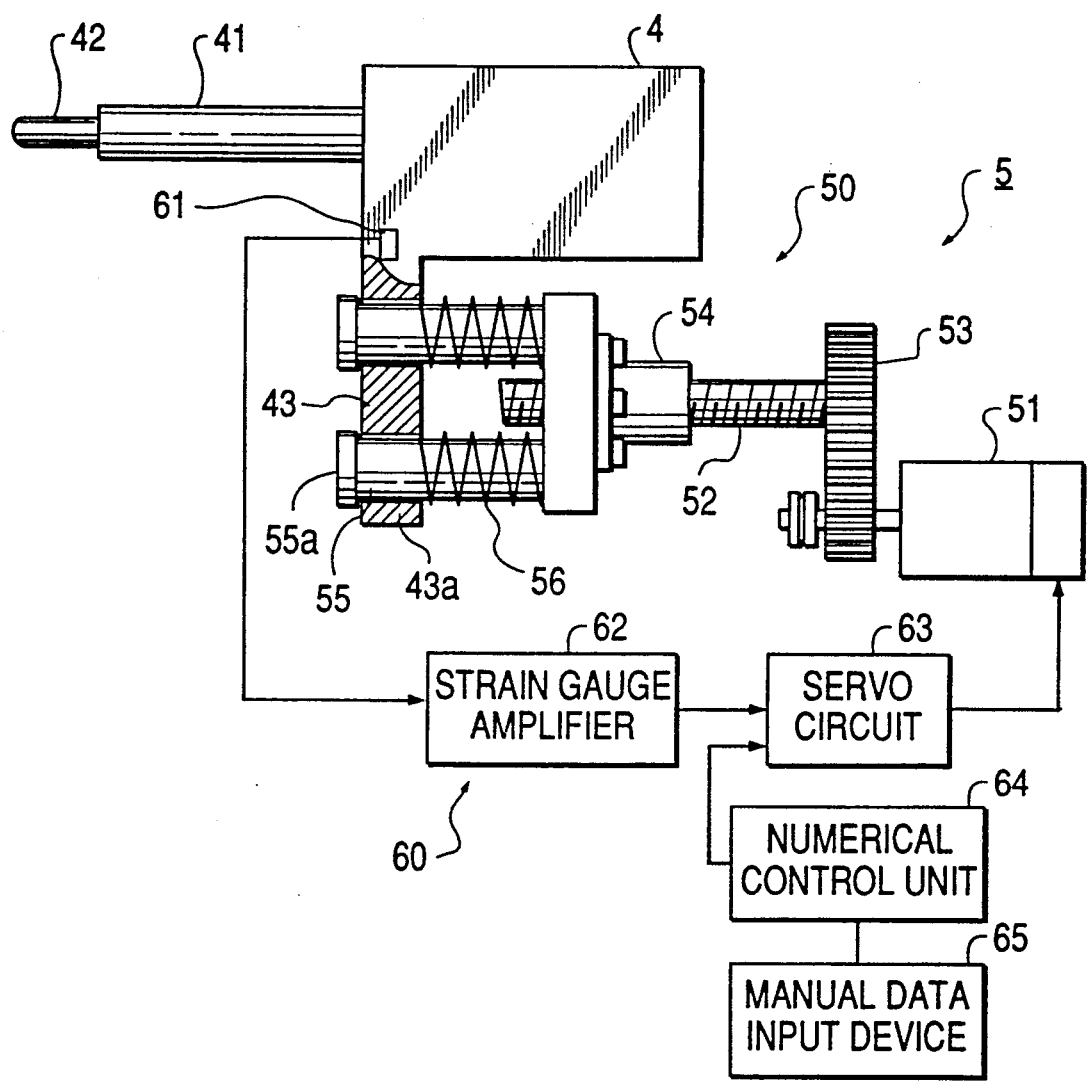
FIG. 1 is a schematic view showing a nozzle touch apparatus according to an embodiment of the present invention and its peripheral elements.
Figure 2:
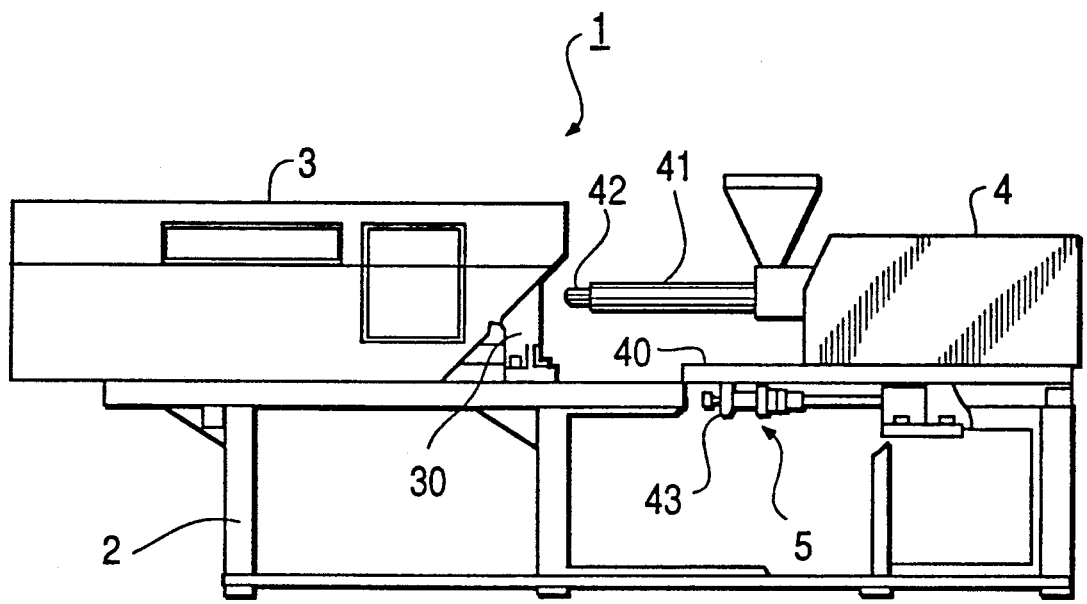
FIG. 2 is a schematic view showing an injection molding machine which is equipped with the nozzle touch apparatus of FIG. 1.
Figure 3:
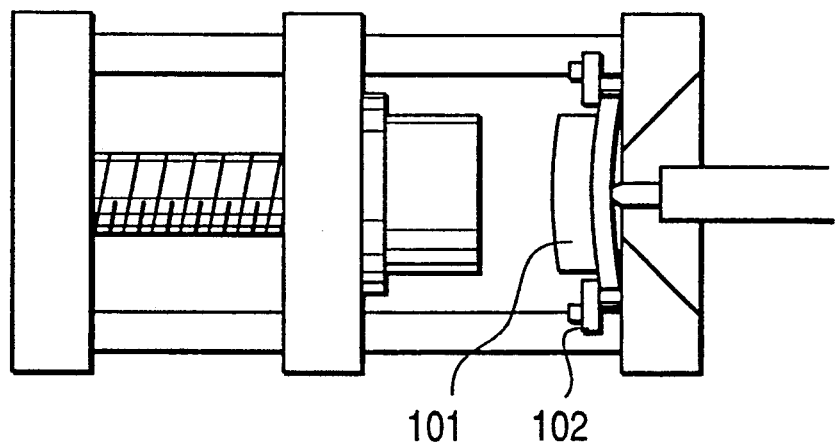
FIG. 3 is a schematic view showing a stationary mold half and clampers of a conventional nozzle touch apparatus, which are deformed during a mold opening process.

Referring to FIGS. 1 and 2, an injection molding machine 1, equipped with a nozzle touch apparatus according to an embodiment of the present invention, comprises a machine frame 2 on which a mold clamping unit 3 and an injection unit 4 are mounted in a facing relation. The injection unit 4 is arranged to be movable toward and away from a stationary platen 30 of the mold clamping unit 3. A nozzle 42 mounted on a distal end of a cylinder assembly 41 of the injection unit 4 is arranged for urged contact with an opposed end surface of a stationary mold half (not shown) mounted on the stationary platen 30.

The nozzle touch apparatus 5 for driving the injection unit 4 toward and away from the mold clamping unit 3 and for generating a predetermined nozzle touch force comprises a transfer section 50 which is disposed between the machine frame 2 and the injection unit 4 for reciprocating the injection unit 4. In the transfer section 50, a ball screw 52 is operatively coupled through a gear train 53 consisting of two gears to an output shaft of a servomotor 51 serving as a driving source, and is supported by the machine frame 2 through appropriate means, not shown, in a manner rotatable but axially immovable. Threadedly engaged with the ball screw 52 is a ball nut 54 having an end surface thereof at its side close to the mold clamping unit, to which surface two guide rods 55 are fixed in a manner movable in unison with the ball nut 54. These guide rods 55 extend toward the mold clamping unit 3, and pass through two through holes 43a, axially formed in an extension portion 43 which is fixed to an extruder base 40 of the injection unit 4 for movement in unison with the extruder base, respectively, and are further provided at their ends at the side facing the mold clamping unit with stoppers 55a. Moreover, each of the guide rods 55 is fitted thereon with a spring 56, which is disposed between opposed surfaces of the ball nut 54 and the extruder base extension portion 43, for generating a nozzle touch force.

The nozzle touch apparatus 5 is further provided with a control section 60 for controlling the drive of the servomotor 51 of the transfer section 50. The control section 60 includes a pressure sensor for detecting an actual nozzle touch force, preferably, a strain gauge 61 which is mounted on a side surface of the extruder base extension portion 43, so as to detect an amount of axial deformation of the extension portion 43 in a nozzle touch state, indicative of the actual nozzle touch force. In the control section 60, the strain gauge 61 has an output terminal connected to an input terminal of a strain gauge amplifier 62 which has an output terminal connected to a first input terminal of a servo circuit 63. A second input terminal of the servo circuit 63 is connected to a control unit which has means for variably setting a predetermined nozzle touch force, so as to serve as a setting section of the nozzle touch apparatus 5, preferably, to a numerical control unit which has a manual data input device 65 and operates to control the drive of the injection molding machine 1. Further, the servo circuit 63 has an output terminal connected to the servomotor 51 of the transfer section 50.

In the following, operation of the nozzle touch apparatus 5 constructed as mentioned above will be explained.

Prior to start of an injection molding cycle, an operator calibrates an output level of the strain gauge 61, and operates the manual data input device 65 to set values of the predetermined nozzle touch force respectively associated with mold opening and mold closing processes. In response to the setting operation, the numerical control unit 64 causes a memory device (not shown) thereof to store these values at its predetermined memory regions. The value of the predetermined nozzle touch force associated with the mold opening process is set to small value (100 kg/cm$^2$) which is less than the value (300 kg/cm$^2$) associated with the mold closing process, to prevent, even in the mold opening process, deformation of the stationary mold half (not shown) and of clampers (not shown) employed for mounting the stationary mold half onto the stationary platen 30.

When the numerical control unit 64 reads out a nozzle touch start command or a mold closing command from a control program, it reads out the value of 300 kg/cm$^2$ of the predetermined nozzle touch force associated with the mold closing process, and then supplies the second input terminal of the servo circuit 63 with an electrical signal whose level corresponds to the same value. At this time, an electrical signal, applied from the strain gauge 61 to the first input terminal of the servo circuit 63 through the strain gauge amplifier 62, has its level which is small in magnitude and corresponds to the nozzle touch force of 0 kg/cm$^2$ associated with a condition in which a nozzle touch state is released or that of 100 kg/cm$^2$ associated with the mold opening process. As a result, the servo circuit 63 operates to cause a driving current to flow through the servomotor 51, which corresponds in magnitude to the deviation between the electrical signal levels appearing at its first and second input terminals, to thereby rotate the servomotor 51 in the forward direction. With this motor rotation, the ball screw 52 rotates forwardly through the gear train 53, so that the ball nut 54, threadedly engaged with the ball screw, and the guide rods 55 are moved toward the mold clamping unit 3. As a consequence, the extruder base extension portion 43, which is coupled to the ball nut 54 through the guide rods 55 and the spring 56, and hence the injection unit 4 are forwardly moved toward the mold clamping unit 3.

Thereafter, the nozzle 42 of the injection unit 4 is brought into contact with the opposed end surface of the stationary mold half of the mold clamping unit 3, so that the forward movement of the injection unit 4 and the extruder base extension portion 43 is prevented. Whereupon the servomotor 51 is further rotated in the forward direction, and the guide rods 55 are moved forwardly, with the springs 56 gradually compressed. As a result, an axially exerting force produced by the compressed springs 56 is applied to the extension portion 43 to cause a slight compressive deformation of the same portion. Also, the axial force is applied to the nozzle 42 through the extension portion 43 and the cylinder assembly 41 so as to generate a nozzle touch force. During this time period, an electrical signal, corresponding to the axial force of the springs 56 and an amount of axial deformation of the extension portion 43 and indicative of an actual nozzle touch force, is supplied from the strain gauge 61 through the strain gauge amplifier 62 to the first input terminal of the servo circuit 63. The servo circuit 63 operates to control the drive of the servomotor 51 in a feedback manner in accordance with the deviation between the electrical signal levels appearing at its first and second input terminals and indicative of the actual nozzle touch force and the predetermined nozzle touch force associated with the mold closing process, respectively, so that the same deviation is brought to "0". Thereafter, each of the springs 56 is compressed by a predetermined amount, and the actual nozzle touch force is brought in consistency with the predetermined nozzle touch force of 300 kg/cm$^2$. At that time and thereafter, the servo circuit 63 controls the drive of the servomotor 51 in such a manner that the actual nozzle touch force is maintained at the predetermined nozzle touch force. That is, the compressed state of the springs 56 is kept unchanged. Under these conditions, molten resin is injected from the injection unit 4 into a cavity defined by the stationary and movable mold halves (not shown) of the mold clamping unit 3 in a conventional manner, and then holding and cooling processes are performed.

Thereafter, when the numerical control unit 64 reads out a mold opening command from the control program, it reads out the value of 100 kg/cm$^2$ of the predetermined nozzle touch force associated with mold opening process from its memory device, and supplies the second input terminal of the servo circuit 63 with an electrical signal whose level corresponds to the same value. At this time, the first input terminal of the servo circuit 63 is supplied with the electrical signal which is high in level corresponding to the value of 300 kg/cm$^2$ of the predetermined nozzle touch force associated with the mold closing process. As a consequence, the servo circuit 63 operates to rotate the servomotor 51 in the reverse direction in accordance with the deviation between these electrical signal levels. With this motor rotation, the injection unit 4 is gradually moved back in the direction away from the mold clamping unit 3 from a nozzle touch position in the mold closing process, and hence the compressed amount of the springs 56 is gradually decreased. As a consequence, the amount of axial deformation of the extruder base extension portion 43 is gradually decreased, and thus the electrical signal, applied to the first input terminal of the servo circuit 63 and indicative of the actual nozzle touch force, is gradually decreased in level. Thereafter, the actual nozzle touch force is brought in consistency with the predetermined nozzle touch force of 100 kg/cm$^2$ in the mold opening process. At that time and thereafter, the actual nozzle touch force is maintained at the predetermined nozzle touch force for the mold opening. Under these conditions, the mold opening process is carried out, so that the movable mold half mounted on the movable platen of the mold clamping unit 3 is moved away from the stationary mold half. As a result, the urging force applied from the movable mold half onto the stationary mold half is eliminated. However, since the nozzle touch force is reduced beforehand, no substantial deformation is found in the stationary mold half and in the clampers (not shown) employed for mounting the stationary mold half onto the stationary platen 30, even in the case of employing a hollowed and thin type of mold such as a hot runner type of mold.

As mentioned above, the nozzle touch force is controlled in a two-step fashion during the execution of one injection molding cycle. Whereupon the injection molding cycle is repetitively performed, while the nozzle touch force is adjusted to different values between the mold closing process and the mold opening process.

Thereafter, when the numerical control unit 64 reads out a nozzle-touch-state releasing command from the control program upon completion of the injection molding cycle, for instance, it operates, on one hand, to release the aforesaid pressure feedback control mode, and, on the other hand, causes the servomotor 51 to rotate in the reverse direction through the servo circuit 63, so that the injection unit 4 is moved away from the mold clamping unit 3 from the nozzle touch position in the mold opening process. The drive of the servomotor 51 and hence the retreat movement of the injection unit 4 are stopped when the arrival of the injection unit 4 to a predetermined retreat movement end position is detected by an-injection-unit-moving-position detecting means such as a limit switch (not shown) which is disposed at a location separated from the mold clamping unit 3 by a predetermined distance toward the injection unit 4.

The present invention is not limited to the aforementioned embodiment, and various modifications thereof may be made. For instance, although the values of the predetermined nozzle touch force for mold closing and mold opening are set by means of the manual data input device in the foregoing embodiment, these values may be stated beforehand in the control program for the numerical control unit, so as to be read by the numerical control unit from the control program upon start of the mold closing and mold opening processes. Further, a sprue break operation may be effected immediately after the injection process is completed. In this case, it is enough to move the injection unit back by a sprue break amount after the pressure feedback control mode of the control section of the nozzle touch apparatus is released at the time the sprue break is started, as in the case of the aforementioned nozzle-touch-state releasing command being read out. Moreover, in the foregoing embodiment, the arrival of the injection unit to its retreat movement end position is detected by the use of the limit switch when the pressure feedback control mode is released. Alternatively, the injection unit may be moved to its retreat movement end position by arranging the servo circuit of the nozzle touch apparatus so as to effect a conventional position control on the basis of a target position signal supplied from the numerical control unit and indicative of the retreat movement end position of the injection unit and a signal supplied from a position detector which is further mounted on the servomotor of the nozzle touch apparatus and indicative of an actual position.

We claim:

1. A nozzle touch apparatus for use in an injection molding machine, the injection molding machine having a mold clamping unit and an injection unit arranged to be movable toward and away from the mold clamping unit, the nozzle touch apparatus comprising:

a transfer section having a servomotor serving as a driving source, and means for generating a nozzle touch force and for moving the injection unit toward and away from the mold clamping unit;

means for detecting an actual nozzle touch force;

means for variably setting a predetermined nozzle touch force; and control means coupled to the detection means and the setting means for controlling drive of the servomotor in accordance with a deviation between the actual nozzle touch force and the predetermined nozzle touch force.

2. A nozzle touch apparatus according to claim 1, wherein said setting means includes means for setting a first predetermined nozzle touch force associated with a mold opening process, means for setting a second predetermined nozzle touch force associated with a mold closing process, and means for keeping the setting of said first predetermined nozzle touch force associated with the mold opening process at a value less than the setting for said second predetermined nozzle touch force associated with the mold closing process.

3. A nozzle touch apparatus according to claim 1, wherein said transfer section includes an urging member arranged to be movable axially of the injection unit with rotation of said servomotor, and a spring which serves as said nozzle touch force generating means and is disposed between said urging member and the injection unit.

4. A nozzle touch apparatus according to claim 3, wherein the injection unit has an extension portion arranged to be movable in unison therewith and having a hole formed in the injection unit axially of the same unit, said transfer section including a ball screw supported to be rotatable but axially immovable, a ball nut threadedly engaged with said ball screw, and a rod movable in unison with said ball nut and extending through said hole, said ball nut cooperating with said rod to form said urging member, said spring being fitted on said rod and disposed between said extension portion and said ball nut.

5. A nozzle touch apparatus according to claim 1, wherein said detecting means includes a pressure sensor which is provided on that portion of the injection unit whose deformation corresponds in magnitude to said actual nozzle touch force.

6. A nozzle touch apparatus according to claim 5, wherein the pressure sensor is a strain gauge mounted on an extension portion of the injection unit.

7. A nozzle touch apparatus according to claim 1, wherein said transfer section includes a ball nut and a ball screw rotated by said servomotor.

8. A nozzle touch apparatus for use in an injection molding machine, the injection molding machine having a mold clamping unit and an injection unit arranged to be movable toward and away from the mold clamping unit, the nozzle touch apparatus comprising:
  a transfer section having a servomotor serving as a driving source, and means for generating a nozzle touch force and for moving the injection unit toward and away from the mold clamping unit;
  means associated with the injection unit for sensing and outputting a signal indicative of an actual nozzle touch force;
  means for variably setting and outputting a signal indicative of a predetermined nozzle touch force; and
  control means for receiving signals from the sensing means and the setting means for controlling drive of the servomotor in accordance with a deviation between the actual and predetermined nozzle touch force signals.

9. A nozzle touch apparatus according to claim 8, wherein said setting means includes means for setting a first predetermined nozzle touch force associated with a mold opening process, means for setting a second predetermined nozzle touch force associated with a mold closing process, and means for keeping the setting of said first predetermined nozzle touch force associated with the mold opening process at a value less than the setting for said second predetermined nozzle touch force associated with the mold closing process.

10. A nozzle touch apparatus according to claim 8, wherein said transfer section includes an urging member arranged to be movable axially of the injection unit with rotation of said servomotor, and a spring which serves as said nozzle touch force generating means and is disposed between said urging member and the injection unit.

11. A nozzle touch apparatus according to claim 10, wherein the injection unit has an extension portion arranged to be movable in unison therewith and having a hole formed in the injection unit axially of the same unit, said transfer section including a ball screw supported to be rotatable but axially immovable, a ball nut threadedly engaged with said ball screw, and a rod movable in unison with said ball nut and extending through said hole, said ball nut cooperating with said rod to form said urging member, said spring being fitted on said rod and disposed between said extension portion and said ball nut.

12. A nozzle touch apparatus according to claim 8, wherein said detecting means includes a pressure sensor which is provided on that portion of the injection unit whose deformation corresponds in magnitude to said actual nozzle touch force.

13. A nozzle touch apparatus according to claim 12, wherein the pressure sensor is a strain gauge mounted on an extension portion of the injection unit.

* * * * *